United States Patent
Waltner

(10) Patent No.: US 10,167,078 B2
(45) Date of Patent: Jan. 1, 2019

(54) ROTARY OR FIXED WING AIRCRAFT WITH THRUST VECTORING TAIL

(71) Applicant: Sikorsky Aircraft Corporation, Stratford, CT (US)

(72) Inventor: Peter James Waltner, Royal Palm Beach, FL (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 140 days.

(21) Appl. No.: 15/267,752

(22) Filed: Sep. 16, 2016

(65) Prior Publication Data
US 2017/0225778 A1    Aug. 10, 2017

Related U.S. Application Data

(60) Provisional application No. 62/221,484, filed on Sep. 21, 2015.

(51) Int. Cl.
| | | |
|---|---|---|
| *B64C 27/82* | (2006.01) | |
| *B64C 5/02* | (2006.01) | |
| *B64C 5/10* | (2006.01) | |

(52) U.S. Cl.
CPC ............ *B64C 27/82* (2013.01); *B64C 5/02* (2013.01); *B64C 5/10* (2013.01); *B64C 2027/8218* (2013.01); *B64C 2027/8236* (2013.01); *B64C 2027/8263* (2013.01)

(58) Field of Classification Search
CPC ......... B64C 27/22; B64C 27/82; B64C 27/16; B64C 27/52; B64C 2027/8236; B64C 2027/8263; B64C 2027/8272; B64C 2027/8281
See application file for complete search history.

(56) References Cited

U.S. PATENT DOCUMENTS

| | | | | |
|---|---|---|---|---|
| 2,630,984 A | * | 3/1953 | Ballauer ................. | B64C 27/82 244/17.19 |
| 2,771,255 A | * | 11/1956 | Young ..................... | B64C 27/16 244/17.27 |
| 3,065,799 A | * | 11/1962 | McCarty, Jr. ........... | B64C 27/16 244/123.1 |
| 3,155,341 A | * | 11/1964 | Girard .................... | B64C 27/26 244/17.19 |
| 3,247,906 A | * | 4/1966 | Tappan ................... | B64C 27/16 416/99 |
| 3,870,251 A | * | 3/1975 | Breuner ................. | B64C 27/02 244/17.21 |
| 4,702,437 A | * | 10/1987 | Stearns, Jr. ............ | B64C 27/52 244/17.11 |

(Continued)

FOREIGN PATENT DOCUMENTS

| | | | | |
|---|---|---|---|---|
| CH | 422530 A | * | 10/1966 | ............. B64C 27/12 |
| DE | 1581060 B1 | * | 9/1969 | ............. B64C 27/82 |

(Continued)

*Primary Examiner* — Richard R. Green
*Assistant Examiner* — Michael A. Fabula
(74) *Attorney, Agent, or Firm* — Cantor Colburn LLP

(57) ABSTRACT

An aircraft assembly is provided and includes a first member extending from an aircraft airframe, a propeller, which is drivable to rotate and a secondary member on which the propeller is supportable and which is aerodynamically pivotable with respect to the first member.

20 Claims, 5 Drawing Sheets

(56) References Cited

U.S. PATENT DOCUMENTS

| | | | | |
|---|---|---|---|---|
| 5,645,249 | A * | 7/1997 | Hein | B64C 3/56 244/17.11 |
| 5,727,754 | A * | 3/1998 | Carter, Jr. | B64C 27/02 244/17.11 |
| 6,863,241 | B2 * | 3/2005 | Sash | B64C 3/385 244/12.4 |
| 8,424,798 | B2 * | 4/2013 | Challis | B64C 27/26 244/17.11 |
| 8,690,100 | B2 * | 4/2014 | Birkner | B64C 27/025 244/17.11 |
| 8,763,949 | B2 * | 7/2014 | Thomassey | B64C 27/82 244/17.13 |
| 8,777,152 | B2 * | 7/2014 | Thomassey | B64C 27/82 244/17.13 |
| 9,067,676 | B1 * | 6/2015 | Hethcock | B64C 27/82 |
| 9,365,289 | B2 * | 6/2016 | Prud'Homme-Lacroix | B64C 27/52 |
| 2010/0127114 | A1 * | 5/2010 | Nakayama | B64C 27/12 244/17.21 |
| 2016/0332727 | A1 * | 11/2016 | Waltner | B64C 3/42 |
| 2017/0349273 | A1 * | 12/2017 | Parsons | B64C 27/82 |

FOREIGN PATENT DOCUMENTS

| | | | | |
|---|---|---|---|---|
| GB | 1258505 A | * | 12/1971 | B64C 27/02 |
| WO | WO-2015024044 A1 | * | 2/2015 | B64C 27/82 |

* cited by examiner

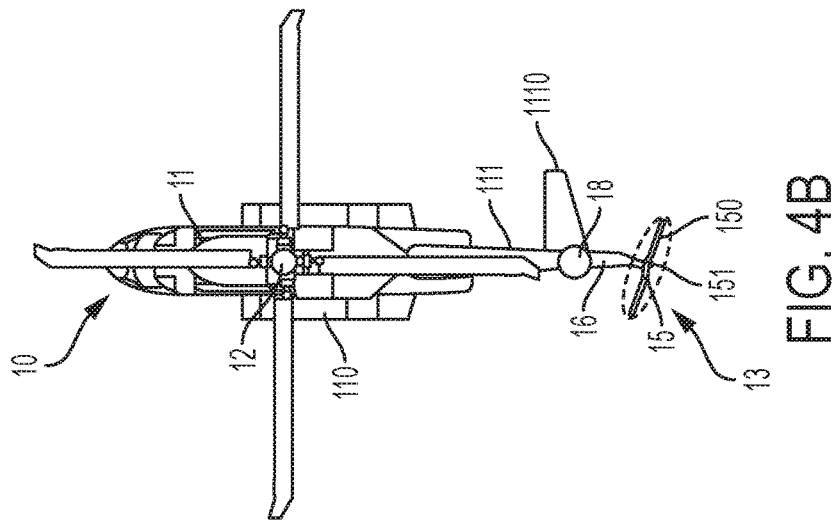
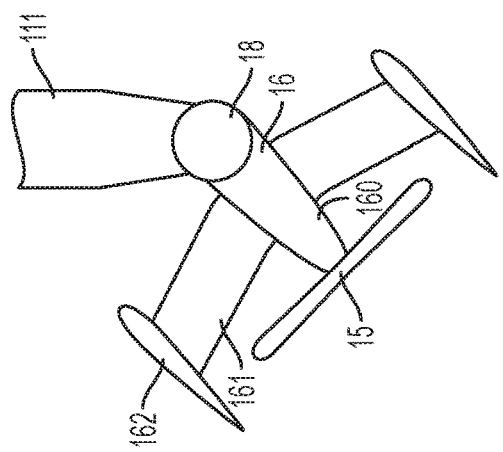
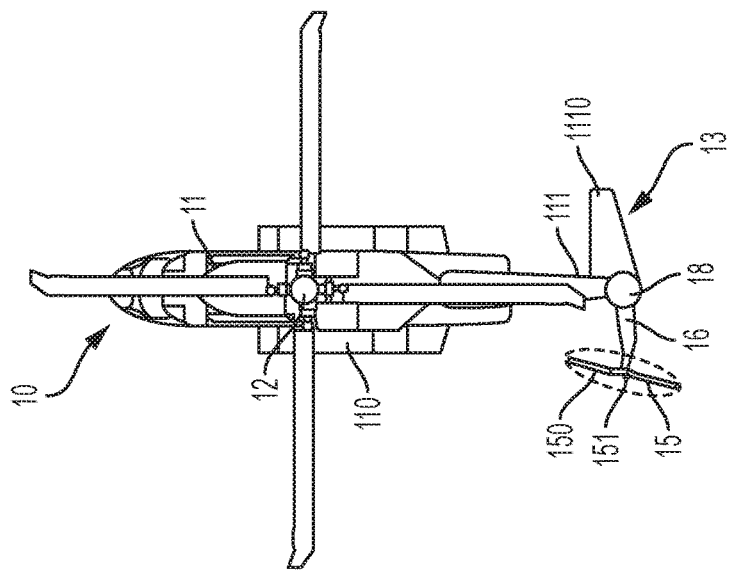
FIG. 4A
FIG. 5
FIG. 4B

ROTARY OR FIXED WING AIRCRAFT WITH THRUST VECTORING TAIL

CROSS-REFERENCE TO RELATED APPLICATIONS

This application claims benefit of priority of U.S. Provisional Application No. 62/221,484 filed on Sep. 21, 2015, the disclosure of which is incorporated by reference.

BACKGROUND

The subject matter disclosed herein relates to an aircraft and, more particularly, to a rotary or fixed wing aircraft with a thrust vectoring tail.

A compound helicopter generally includes an airframe, a main rotor assembly, wings, a tail rotor and one or more propellers or ducted fans. The airframe has a main section, an upper section and a tail section. The main section is formed to define a cockpit that can accommodate a pilot and in some cases one or more crewmen and/or passengers. The upper section is disposed at an upper portion of the main section and the tail section is disposed to extend in the aft direction from the main section. The main rotor assembly is disposed at the upper section of the airframe and may include an upper and lower coaxial, counter-rotating rotors. The tail rotor is disposed at the tail section. The propeller or ducted fans is/are disposed at the tail section or along the side of the fuselage.

The helicopter further includes a flight control computer, an engine and a transmission. The engine is configured to generate power that can be used to drive rotations of the main rotor assembly and the propeller in order to generate lift and thrust for the helicopter. The transmission transmits the power to the main rotor assembly and the propeller. The flight control computer controls various operations of the engine and the transmission as well as the collective and cyclic operations of the main rotor assembly and the propeller(s) in accordance with pilot inputted commands and current flight conditions.

As a result of the compound helicopter including multiple propellers or ducted fans in addition to the tail rotor, the overall weight and part count of the compound helicopter can be relatively high. This can lead to performance degradation, such as reduced fuel economy to transport a given payload weight to a destination. Additionally, for the case of a coaxial compound helicopter, there are opportunities to improve the yaw control capability with respect to current coaxial pusher-prop designs.

BRIEF DESCRIPTION

According to one aspect, an aircraft assembly includes a first member extending from an aircraft airframe, a propeller, which is drivable to rotate and a secondary member on which the propeller is supportable and which is aerodynamically pivotable with respect to the first member.

In accordance with additional or alternative embodiments, the second member pivoting permits the propeller to assume at least pusher-prop and tail rotor configurations.

In accordance with additional or alternative embodiments, a rotational axis of the propeller is variable relative to a longitudinal axis of the secondary member.

In accordance with additional or alternative embodiments, the secondary member includes a central support member, one or more horizontal stabilizers extending outwardly from the central support member and one or more vertical stabilizers extending from respective distal ends of the horizontal stabilizers.

In accordance with additional or alternative embodiments, a vertical stabilizer is controllably pivotable relative to the first member.

According to another aspect of the disclosure, an aircraft tail assembly includes a member extending from an aircraft airframe, a propeller, which is drivable to rotate, a secondary empennage on which the propeller is supportable and an interface which couples the secondary empennage to the member and permits relative member-secondary empennage pivoting that is drivable by aerodynamic forces.

In accordance with additional or alternative embodiments, the interface comprises a gearbox by which the member and the secondary empennage are coupled. The gearbox is configured to transmit power to drive rotations of the propeller from the member to the secondary empennage and to permit the relative member-secondary empennage pivoting.

In accordance with additional or alternative embodiments, the gearbox includes a first housing portion, which is fixed relative to the member, a second housing portion, which is rotatable relative to the first housing portion, a bearing assembly by which the first and second housing portions are coupled to permit relative rotations of the first and second housing portions, bevel gearing and a gearbox shaft. The gearbox shaft is rotatably supported in the first and second housing portions and is connectable by the bevel gearing to an input shaft of the member via the first housing portion and an output shaft of the secondary empennage via the second housing portion.

In accordance with additional or alternative embodiments, the relative member-secondary empennage pivoting permits the propeller to assume at least pusher-prop and tail rotor configurations.

In accordance with additional or alternative embodiments, blades of the propeller are cyclically controllable.

In accordance with additional or alternative embodiments, a rotation axis of the propeller is variable relative to a longitudinal axis of the secondary empennage.

In accordance with additional or alternative embodiments, the secondary empennage includes a central support member, one or more horizontal stabilizers extending outwardly from the central support member and one or more vertical stabilizers extending from respective distal ends of the horizontal stabilizers.

In accordance with additional or alternative embodiments, a controllably pivotable vertical stabilizer is controllably pivotable relative to the member.

In accordance with additional or alternative embodiments, the secondary empennage includes hollow tubing by which a control signal is transmittable through the propeller.

In accordance with additional or alternative embodiments, a lock system is provided by which secondary empennage motion is one or more of pivotably fixable and pivotably dampable relative to the member.

These and other advantages and features will become more apparent from the following description taken in conjunction with the drawings.

BRIEF DESCRIPTION OF THE DRAWINGS

The following subject matter is particularly pointed out and distinctly claimed in the claims at the conclusion of the specification. The foregoing and other features, and advantages are apparent from the following detailed description taken in conjunction with the accompanying drawings in which:

FIGS. 4A and 4B are top down views of an aircraft in hover and forward flight modes in accordance with embodiments;

FIG. 5 is a top down view of an aircraft tail assembly in accordance with embodiments;

The detailed description explains embodiments, together with advantages and features, by way of example with reference to the drawings.

DETAILED DESCRIPTION

As will be described below, a rotary or fixed wing aircraft is provided. The aircraft may be configured, for example, as a helicopter having a single main rotor with enhanced maneuverability and increased speed similar to that of a compound helicopter but with a light overall weight. The enhanced maneuverability and increased speed are drawn from an aircraft tail assembly. The aircraft tail assembly includes a tail or member extending from an aircraft airframe, a propeller, which is drivable to rotate and which includes cyclically controllable propeller blades, a secondary empennage on which the propeller is supportable and an interface by which the tail or member and the secondary empennage are coupled. The gearbox is configured to transmit power to drive rotations of the propeller from the tail to the secondary empennage and to permit relative tail-secondary empennage pivoting resulting from cyclic propeller blade control.

The above-mentioned aircraft tail assembly will now be described with reference to FIGS. 1-3 and 4A-12.

Figure 1:
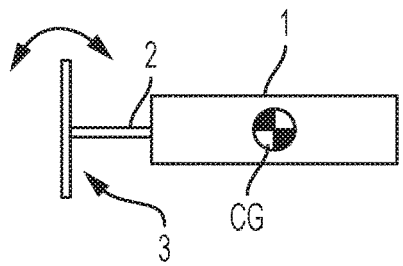
FIG. 1 is a schematic diagram of an aircraft in accordance with embodiments.
Figure 2:
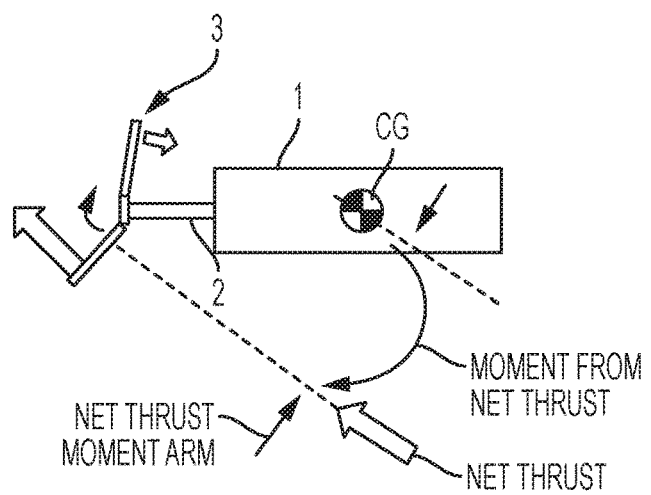
FIG. 2 is a schematic diagram of an aircraft in accordance with embodiments.
Figure 3:
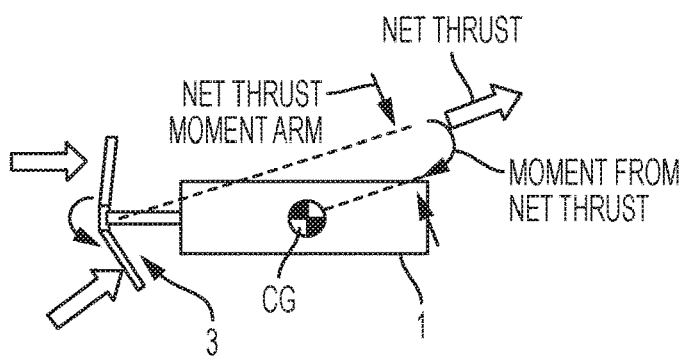
FIG. 3 is a schematic diagram of an aircraft in accordance with embodiments.

An aircraft 1 (see FIGS. 1-3) and an aircraft 10 (see FIG. 4A-12) are provided. The aircraft 1 has an airframe, a shaft 2 and a propeller 3 that can be configured as a propeller with an articulated hub and offset flapping hinges (and, optionally, with a teetering hub and flexible prop/rotor components). In any case, the propeller 3 may be disposed as a puller propeller (see FIG. 2) or as a pusher propeller (see FIG. 3) and the blades of the propeller may be cyclically and collectively controlled. Such control and, in particular, such cyclic control of the propeller blades can be used as cyclic inputs to rotate the propeller plane and to generate a moment from net thrust relative to a center of gravity (CG) of the aircraft 1. As such, the propeller plane rotation may be simply generated from aerodynamic interaction with the airflow surrounding it. Therefore, such a propeller may be used to generate pitching and yawing moments and provide a similar function of elevators and rudders in conventional fixed wing aircraft and differential torque for yaw control in coaxial helicopters. This pitch and yaw control is applicable to many aircraft types including, but not limited to, fixed wing and rotary wing aircraft. Additionally, while the exemplary embodiments shown in FIGS. 1-3 depict an aircraft with the propeller 3 nominally in-line with the CG, alternate embodiments include those in which one or more propellers 3 are disposed as described at various locations on the aircraft structure (e.g., on the wings, the tail, the nose, the engine pods, etc.).

With reference to FIGS. 4A-12, the aircraft 10 includes an airframe 11, a main rotor assembly 12 and an aircraft tail assembly 13. The airframe 11 has a main section 110, an upper section and a tail 111. The main section 110 is formed to define a cockpit that can accommodate a pilot and in some cases one or more crewmen and/or passengers. The upper section is disposed at an upper portion of the main section 110 and the tail 111 is disposed to extend in the aft direction from the main section 110. The main rotor assembly 12 is operably disposed at the upper section of the airframe 11 and includes a single, possibly rigid, main rotor and a hub assembly that is rotatable about a rotational axis defined through the airframe 11.

The aircraft tail assembly 13 includes a distal portion of the tail 111, a propeller 15, which is drivable to rotate and which comprises collectively and cyclically controllable propeller blades 150, a secondary empennage 16 on which the propeller 15 is supportable, a gearbox 17 (see FIG. 10) and an interface 18 by which the tail 111 and the secondary empennage 16 are coupled. The interface 18 is configured to transmit power to drive rotations of the propeller 15 from the tail 111 to the secondary empennage 16 and to permit relative pivoting of the tail 111 and the secondary empennage 16 that results from cyclic control of the propeller blades 150 and/or aerodynamic control of vertical tail surfaces (see FIGS. 6-8). In the illustrated embodiment of FIG. 6, the distal portion of the tail 111 includes a stationary horizontal stabilizer 1110 that extends from the tail 111.

Although the propeller 15 is described herein in singular form, it is to be understood that the aircraft 10 may include one or more propellers 15 with varied tail configurations and locations where the one or more propellers 15 are attached to the aircraft 10. The description of only those embodiments in which the aircraft 10 includes a single propeller 15 is provided to aid in clarity and brevity but it is noted that some examples of variations include, but are not limited to, configurations in which one or more propellers are attached to the aircraft in multiple locations on the tail 111, configurations in which the tail 111 is substantially integrated with the main section 110 or upper section and configurations in which the tail 111 and the aircraft tail assembly 13 are located below and in the downwash of the main rotor. Additionally, for the sake of clarity, the secondary empennage 16 described herein is generally of substantial structure. However, example variations include, but are not limited to, alternative configurations that minimize the size of the secondary empennage 16 and/or substantially integrate the secondary empennage 16 with the interface 18.

The aircraft 10 further includes a fly-by-wire capable or command mixing flight control computer, an engine and a transmission. The engine is configured to generate power that can be used to drive rotations of the main rotor assembly 12 and to drive the rotations of the propeller 15 in order to generate lift and thrust for the aircraft 10 and in order to provide for yaw control of the aircraft 10. The transmission transmits the generated power to the main rotor assembly 12 and the aircraft tail assembly 13. The flight control computer controls various operations of the engine and the transmission as well as the collective and cyclic operations of individual blades of the main rotor and the propeller blades 150 in accordance with pilot inputted commands and current flight conditions.

The propeller 15 may include a propeller hub 151, which is coupled to a distal end of the secondary empennage 16. The propeller hub 151 may be of an articulated hub design and the propeller blades 150 may be attached to the propeller hub 151 by way of offset flapping hinges although it is to be understood that the hinges can be effectively supplemented with or replaced by a flexible prop-rotor construction that provides for an effective hinge offset or a teetering hub. These and other embodiments provide for a variable rotational axis for the propeller 15 relative to a longitudinal axis of the secondary empennage 16 such that a nominal tip path axis of rotation for the propeller 15 may be controlled independently of a mechanical drive axis of rotation of the propeller 15.

With the construction described above, the cyclic and collective control of the propeller blades 150 can be managed to control the propeller blades 15 to flap/fly to a position such that the nominal tip path axis of rotation may be significantly different from the axis of rotation of the mechanical drive axis (i.e., the axis of rotation of the mechanical drive axis may be fixed with respect to and extends from the secondary empennage 16). That is, at flat pitch or when only collective control is applied to the propeller blades 150, the tip path axis of rotation may be substantially coincident with the mechanical drive axis of rotation. By contrast, where cyclic control is applied to the propeller blades 150, the propeller 15 will be urged to rotate, pivot, flex and/or teeter with respect to the secondary empennage 16. With the propeller 15 urged to move in this manner, transverse forces perpendicular to the rotation axis as well as a moment will be applied by the propeller blades 150 on the propeller hub 151.

Alternatively, the propeller hub 151 may be of a rigid rotor design. In such cases, flapping may be minimized when cyclic and/or collective controls are applied to the propeller 15 and the rotation axis of the propeller 15 remains in line with the mechanical drive axis of rotation. While rotation of the propeller 15 remains aligned with the rotation axis, cyclic asymmetric forces due to relative airflow over the propeller, collective application and cyclic application will result in both a transverse force and a moment being applied by the propeller blades 150 on the propeller hub 151.

Absent any locking of the secondary empennage 16 in place (as will be described below), this urging and the transverse forces of propeller 15 generate moment forces about interface 18 on the secondary empennage 16, which sum with the moment forces applied at the propeller hub 151 by the propeller blades 150, that cause the secondary empennage 16 to pivot relative to the tail 111. Thus, in accordance with embodiments, the cyclic control of the propeller blades 15 effectively provides for the pivoting of the secondary empennage 16 relative to the tail 111 such that the propeller 15 is movable between and assumes at least a tail rotor configuration (see FIG. 4A) and a pusher-prop configuration (see FIG. 4B).

Figure 7:
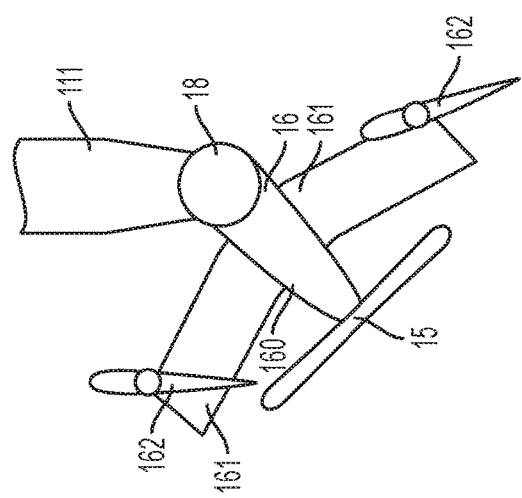
FIG. 7 is a top down view of an aircraft tail assembly in accordance with embodiments.

As shown in the embodiments depicted in FIGS. 5 and 7, the secondary empennage 16 includes a central support member 160, first and second horizontal stabilizers 161 extending outwardly from opposite sides of the central support member 160 and vertical stabilizers 162 extending in opposite directions out of the planes of each of the first and second horizontal stabilizers 161 from respective distal ends of each of the first and second the horizontal stabilizers 161. Alternatively, as shown in the embodiments depicted in FIGS. 6 and 8 (and 9), the secondary empennage 16 includes the central support member 160, only a single horizontal stabilizer 161 extending outwardly from a side of the central support member 160 and vertical stabilizers 162 extending out of the plane of the single horizontal stabilizer 161 from the single horizontal stabilizer 161 (see FIG. 6) or from the propeller hub 151 of the propeller 15 (see FIGS. 8 and 9). In each case, the vertical stabilizers 162 may be controlled to pivot relative to the secondary empennage 16 and, where multiple vertical stabilizers 162 are provided as in the embodiments of FIG. 7, the vertical stabilizers 162 may be independently controlled relative to one another.

Figure 8:
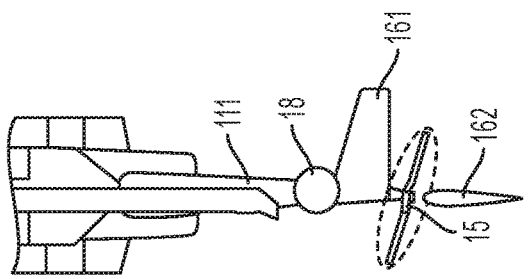
FIG. 8 is a top down view of an aircraft tail assembly in accordance with embodiments.
Figure 9:
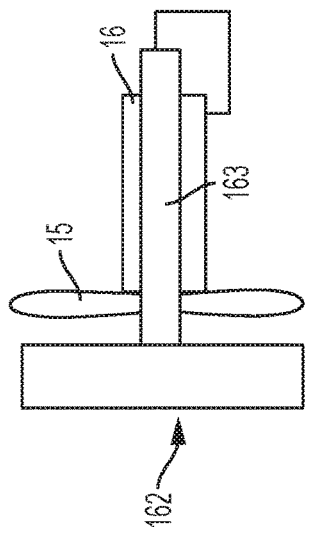
FIG. 9 is a side view of an aircraft tail assembly in accordance with embodiments.
Figure 6:
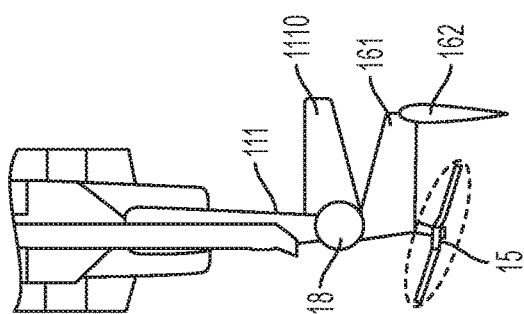
FIG. 6 is a top down view of an aircraft tail assembly in accordance with embodiments.
Figure 10:
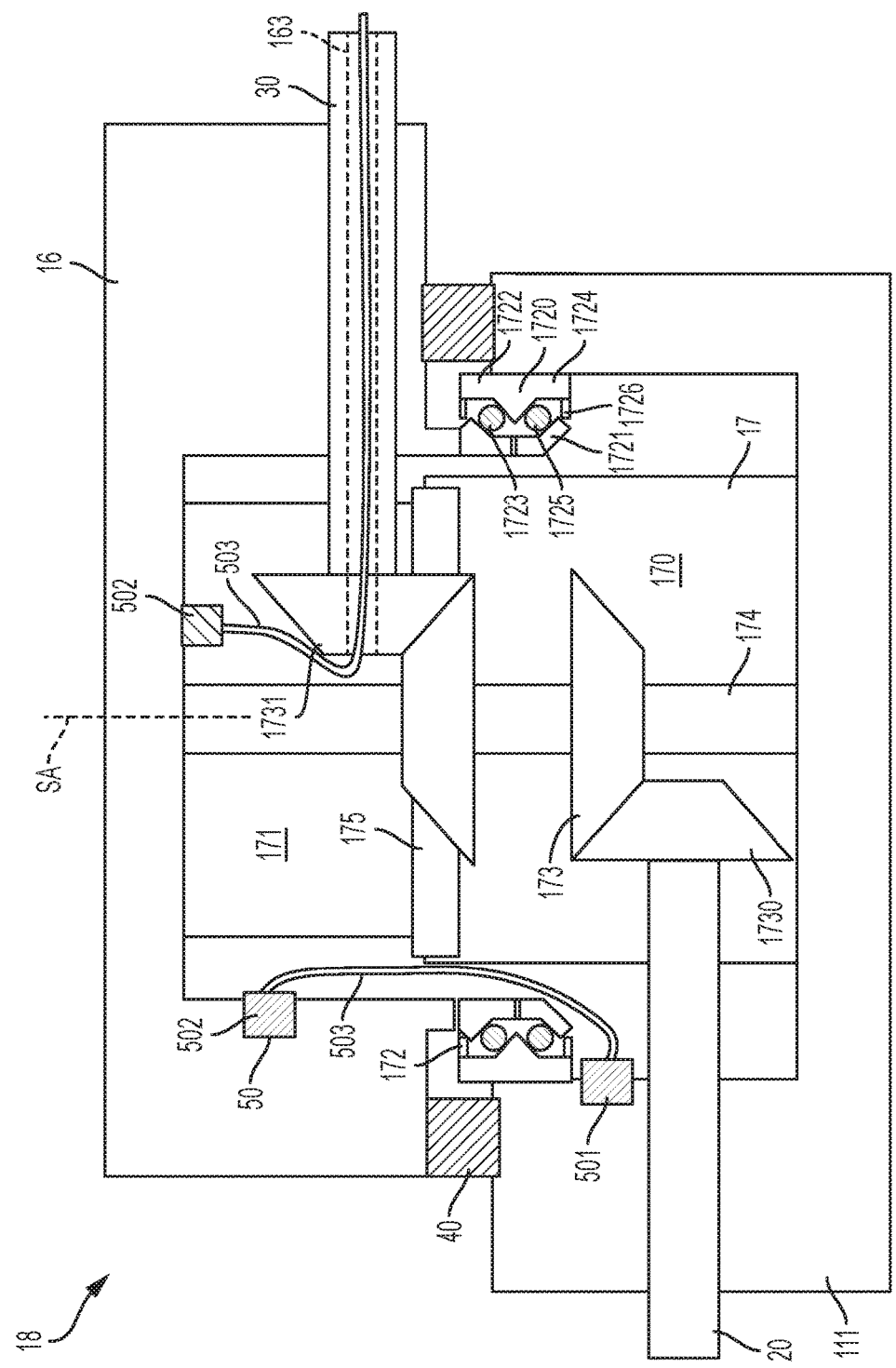
FIG. 10 is a schematic illustration of a gearbox of an aircraft tail assembly in accordance with embodiments.

For the embodiments of FIG. 8 or for any embodiments in which a controllable element is disposed in the downwash side of the propeller 15, the secondary empennage 16 may include hollow tubing 163 as shown in FIGS. 9 and 10. Such hollow tubing 163 can be formed to define a pathway or conduit through which mechanical/hydraulic/electrical/sensor lines pass such that one or more control signal(s) and sensor feedback are transmittable through, over, under or otherwise around the propeller 15 to the downwash side thereof.

As shown in the embodiment depicted in FIG. 10, the interface 18 includes a mechanical drive connection between tail 111 systems and secondary empennage 16 systems and an input shaft 20 and an output shaft 30 are provided for use with the aircraft 10. The input shaft 20 extends along the tail 111 and is rotatable about a longitudinal axis thereof. The output shaft 30 extends along the secondary empennage 16 and is rotatable about a longitudinal axis thereof. The input shaft 20 is driven to rotate by the engine and the transmission and the output 30 is driven to rotate by the input shaft 20 via the gearbox 17.

As further shown in the embodiment depicted in FIG. 10, the gearbox 17 is provided as an intermediate gearbox (IGB) and includes a first housing portion 170, a second housing portion 171, a bearing assembly 172, bevel gearing 173 of variable numbers of gears and a gearbox shaft 174. The first housing portion 170 is rotationally and pivotably fixed relative to the tail 111 and is disposed at least partially about the input shaft 20 such that the input shaft 20 tightly fits through portions of both the tail 111 and the first housing portion 170. The second housing portion 171 is rotationally and pivotably fixed to the secondary empennage 16 and is disposed at least partially about the output shaft 30 such that the output shaft 30 tightly fits through portions of both the secondary empennage 16 and the second housing portion 171.

The secondary empennage 16 is coupled to the tail 111 by the bearing assembly 172 and an interface seal 175 is provided to support the second housing portion 171 on the first housing portion 170 while also permitting relative rotation between the first and second housing portions 170 and 171 and while preventing leakage of lubricating fluid contained within first and second housing portions 170 and 171. Thus, by virtue of the configuration of the bearing assembly 172 and the interface seal 175, the secondary empennage 16 is pivotable relative to the tail 11 and the second housing portion 171 is rotatable relative to the first housing portion 170. Such relative rotation is defined about a shaft axis SA that is defined along the gearbox shaft 174. The ability of the second housing portion 171 to rotate relative to the first housing portion 170 permits the relative pivoting of the second empennage 16 relative to the tail 111 and allows torque to be transmitted from the input shaft 20 to the output shaft 30.

As further illustrated in FIG. 10, a lock system 40 and a control and sensor interface system 50 are provided at or proximate to the gearbox 17. The lock system 40 is operable in an engaged condition and a disengaged condition. In the engaged condition, the secondary empennage 16 is pivotably fixed by the lock system 40 relative to the tail 111 even while the propeller 15 rotates and cyclic controls are applied to the propeller blades 150. By contrast, with the lock system 40 in the disengaged condition, the lock system 40 permits the relative pivoting of the secondary empennage 16 and the tail 111. The control and sensor interface system 50 may include airframe hydraulic and/or electrical system and sensor ports 501, secondary empennage hydraulic and/or electrical sensor ports 502 and line(s) 503. The line(s) 503 serve to connect the airframe hydraulic and/or electrical system and sensor ports 501 with the secondary empennage hydraulic and/or electrical system and sensor ports 502 to support systems installed on secondary empennage 16. Additionally, the line(s) 503 connect the secondary empennage hydraulic and/or electrical system and sensor ports 502 to further secondary empennage 16 features by way of the hollow tubing 163.

The hollow tubing 163 may be integrated with output shaft 30 or may be disposed inside output shaft 30 with bearings (not shown in FIG. 10) to prevent chafing of lines 503 within the interior of output shaft 30.

As further illustrated in FIG. 10, the bearing assembly 172 includes an outer race 1720, an inner race 1721, an upper track 1722, upper bearings 1723, a lower track 1724, lower bearings 1725 and bearing seals 1726. The outer race 1720 is fixed to an interior facing wall of the tail 111 and the inner race 1721 is fixed to an end wall of the secondary empennage 16. The upper and lower tracks 1722 and 1724 are defined between the outer and inner races 1720 and 1721 and constrain the upper and lower bearings 1723 and 1725 therein. The upper and lower bearings 1723 and 1725 cooperatively maintain an alignment of the tail 111 and the secondary empennage 16 and permit the relative pivoting between the tail 111 and the secondary empennage 16.

Although embodiments of the bearing assembly 172 have been described herein with reference to FIG. 10, it is to be understood that multiple variations of the bearing assembly 172 may be provided. For example, the outer race 1720 may be fixed to an end wall of the tail 111 and the inner race 1721 may be fixed to an exterior facing wall of the secondary empennage 16 or one or both of the outer race 1720 and the inner race 1721 may be supported on an elongate member with a bulged end about which up to four sealed bearing tracks are defined, or the mechanical bearing assembly 172 may be replaced with a fluidic bearing assembly which may have favorable damping characteristics for certain applications. In any case, the description of the bearing assembly 172 of FIG. 10 is provided for clarity and brevity and is intended only as a non-limiting example.

The gearbox shaft 174 is seated within respective central portions of the first and second housings 170 and 171 and is rotatable about the shaft axis SA. The bevel gearing 173 is supported on the gearbox shaft 174 and includes an input bevel gear 1730 and an output bevel gear 1731. The input bevel gear 1730 is configured for beveled engagement with a bevel gear of the input shaft 20 (e.g., at 90°, or 45° or 0°) and the output bevel gear 1731 is configured for beveled engagement with a bevel gear of the output shaft 30 (e.g., at 90°, 45° or 0°). Thus, in order to provide for a driving of propeller 15 rotations, the input shaft 20 is driven to rotate by the engine and transmission, the input shaft 20 drives rotations of the gearbox shaft 174 about the shaft axis SA via the input bevel gear 1730 and the gearbox shaft 174 drives rotations of the output shaft 30 by way of the output bevel gear 1731.

In accordance with alternate embodiments, power to drive the propeller 15 is transmittable through the tail 111 by way of structures and features other than a mechanical drive shaft. In these or other cases, the interface 18 includes similar control and sensor interface systems 50, hydraulic and/or electrical sensor system ports 502 and line(s) 503, bearing assemblies 172 and lock systems 40 as generally described above. However, the input shaft 20, the output shaft 30 and the gearbox 17 would be replaced by alternative power transmission mechanisms (hydraulic, electrical, pneumatic lines or the like) appropriate for various aircraft types while still maintaining the function which allows the secondary empennage 16 to rotate with respect to tail 111.

During an operation of the aircraft tail assembly 13 in which the aircraft 10 transitions from hover mode to forward flight mode, the propeller 15 may be initially disposed in a tail rotor configuration (see FIG. 4A) with the lock system 40 engaged to maintain the tail rotor configuration. In this condition, the propeller 15 is driven to rotate so as to generate a torque counter to that of the main rotor assembly 12 and to thereby control heading and yaw rate of the aircraft 10. Here, applications of collective and cyclic controls of the propeller blades 150 provide for anti-torque torque and micro-adjustments of the aircraft 10 attitude, respectively.

At an initiation of the transition, a cyclic command is applied to the propeller blades 150 in order to generate a particular moment on the secondary empennage 16 to prepare the secondary empennage 16 for transition and shortly thereafter the lock system 40 is disengaged. At this point, the generated moment causes the secondary empennage 16 to pivot relative to the tail 111 toward the pusher-prop configuration (see FIG. 4B). Then, once the secondary empennage 16 reaches the pusher-prop configuration, the lock system 40 re-engages to lock the propeller 15 in place and the cyclic command used to generate the particular command may be cancelled. At this point, the propeller 15 may be continually driven to generate thrust for the aircraft 10 in the forward flight mode with the collective and cyclic commands used for increasing/decreasing thrust and for adjusting pitch/yaw, respectively.

Optionally, the lock system 40 may not be re-engaged in order to provide additional directional control capability by rotating the secondary empennage 16 to various positions between the pusher prop configuration (see FIG. 4B) and the tail rotor configuration (see FIG. 4A) and actively controlling this secondary empennage 16 position and propeller 15 thrust. Such control may be implemented manually or automatically via appropriate mixing of sensor inputs to achieve a desired control output in the flight control computer.

Figure 12:
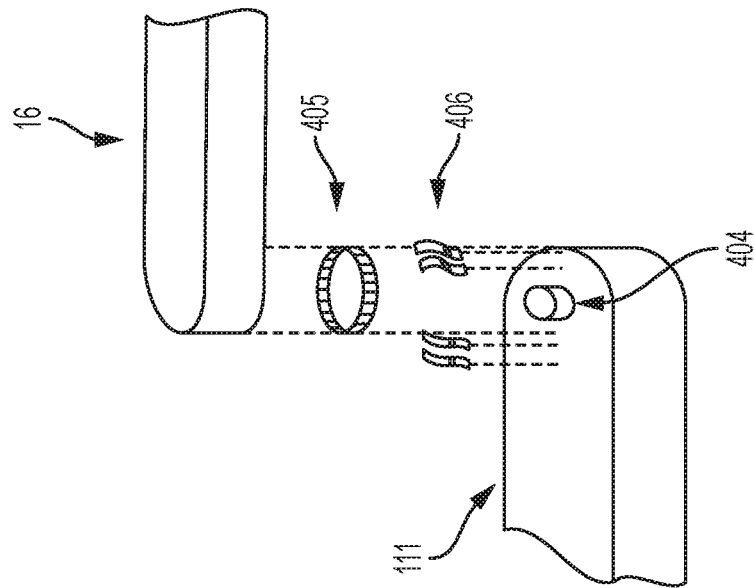
FIG. 12 is an exploded perspective view of a lock system in accordance with embodiments.
Figure 11:
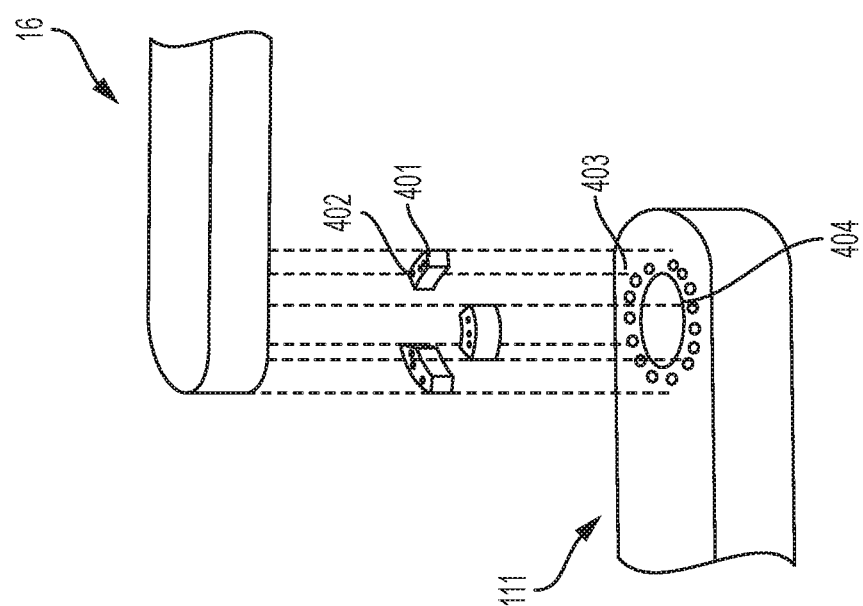
FIG. 11 is an exploded perspective view of a lock system in accordance with embodiments.

With reference to FIGS. 11 and 12, embodiments of the lock system 40 will now be described.

As shown in FIG. 11, pin lock actuators 401 including pins 402 are coupled to the secondary empennage 16, and a rack 403 to receive the pins 402 from the pin lock actuators 401 are provided in the tail 111 about a cavity 404 in which the first housing portion 170 is disposable. In this case, the rack 403 receives the pins 402 from the pin lock actuators 401 in order to engage the lock system 40 and to thereby prevent relative pivoting between the secondary empennage 16 and the tail 111. By contrast, the pins 402 are retracted into the pin lock actuators 401 in order to disengage the lock system 40. The retraction (and extension) of the pins 402 may be achieved by a spring-loaded solenoid-based or servo actuation element. It is to be understood that the configuration of FIG. 11 is reversible such that the pin lock actuators 401 are coupled to the tail 111 and the rack 403 is provided in the secondary empennage 16.

As shown in FIG. 12, a drum 405 is fixed to the secondary empennage 16 and drum calipers 406 are fixed to the tail 111 about the cavity 404. In this case, the drum calipers 406 are powered by way of the tail 111 and grip onto the drum 405 in order to engage the lock system 40 and to thereby prevent relative pivoting between the secondary empennage 16 and the tail 111. By contrast, when the drum calipers 406 are not powered, the drum 405 is released and the lock system 40 is disengaged. Additionally, the drum calipers 406 may be metered to vary pressure and provide damping (i.e., the secondary empennage is not 100% fixed) in the rotation of secondary empennage 16 with respect to the tail 111. In accordance with alternative embodiments, the drum 405 and the drum calipers 406 may be provided as a disk and caliper system that is similar to that found in disk-brake systems on cars.

While the description detail is in connection with only a limited number of embodiments, it should be readily understood that the description is not limited to such disclosed embodiments. Rather, modifications can be made to incorporate any number of variations, alterations, substitutions or equivalent arrangements not heretofore described, but which are commensurate with the spirit and scope herein. Additionally, while various embodiments have been described, it is to be understood that aspects may include only some of the described embodiments. Accordingly, the description is not to be seen as limited by the foregoing description, but is only limited by the scope of the appended claims.

What is claimed is:

1. An aircraft assembly, comprising:
   a first member extending from an aircraft airframe;
   a propeller, which is drivable to rotate; and
   a second member on which the propeller is supported and which is aerodynamically pivotable with respect to the first member;
   wherein a rotational axis of the propeller is variable relative to a longitudinal axis of the second member.

2. The aircraft assembly according to claim 1, wherein pivoting of the second member permits the propeller to assume at least pusher-prop and tail rotor configurations.

3. The aircraft assembly according to claim 1, further comprising an interface which couples the second member to the first member and permits relative first member-second member pivoting that is drivable by aerodynamic forces.

4. The aircraft assembly according to claim 1, wherein the second member comprises:
   a central support member;
   one or more horizontal stabilizers extending outwardly from the central support member; and
   one or more vertical stabilizers extending from respective distal ends of the horizontal stabilizers.

5. The aircraft assembly according to claim 1, further comprising a vertical stabilizer, which is controllably pivotable relative to the first member.

6. An aircraft tail assembly, comprising:
   a member extending from an aircraft airframe;
   a propeller, which is drivable to rotate;
   an empennage on which the propeller is supported; and
   an interface which couples the empennage to the member and permits relative member-empennage pivoting that is drivable by aerodynamic forces.

7. The aircraft tail assembly according to claim 6, wherein the interface comprises a gearbox by which the member and the empennage are coupled,
   the gearbox being configured to transmit power to drive rotations of the propeller from the member to the empennage and to permit the relative member-empennage pivoting.

8. The aircraft tail assembly according to claim 7, wherein the gearbox comprises:
   a first housing portion, which is fixed relative to the member;
   a second housing portion, which is rotatable relative to the first housing portion;
   a bearing assembly by which the first and second housing portions are coupled to permit relative rotations of the first and second housing portions;
   bevel gearing; and
   a gearbox shaft, which is rotatably supported in the first and second housing portions, the gearbox shaft being connectable by the bevel gearing to:
   an input shaft of the member via the first housing portion, and
   an output shaft of the empennage via the second housing portion.

9. The aircraft tail assembly according to claim 6, wherein the relative member-empennage pivoting permits the propeller to assume at least pusher-prop and tail rotor configurations.

10. The aircraft tail assembly according to claim 6, wherein blades of the propeller are cyclically controllable.

11. The aircraft tail assembly according to claim 6, wherein a rotation axis of the propeller is variable relative to a longitudinal axis of the empennage.

12. The aircraft tail assembly according to claim 6, wherein the empennage comprises:
   a central support member;
   one or more horizontal stabilizers extending outwardly from the central support member; and
   one or more vertical stabilizers extending from respective distal ends of the horizontal stabilizers.

13. The aircraft tail assembly according to claim 12, wherein the one or more vertical stabilizers are controllably pivotable relative to the central support member.

14. The aircraft tail assembly according to claim 6, wherein the empennage comprises hollow tubing defining a pathway through which a line is passed by which a control signal is transmittable through the propeller.

15. The aircraft tail assembly according to claim 6, further comprising a lock system by which empennage motion is one or more of pivotably fixable and pivotably dampable relative to the member.

16. The aircraft tail assembly according to claim 6, further comprising a controllably pivotable vertical stabilizer extending from a propeller hub of the propeller.

17. An aircraft assembly comprising:
   a first member extending from an aircraft airframe;
   a propeller, which is drivable to rotate; and
   a second member on which the propeller is supported and which is aerodynamically pivotable with respect to the first member;
   wherein the second member pivoting permits the propeller to assume at least pusher-prop and tail rotor configurations.

18. The aircraft assembly of claim 17, further comprising an interface which couples the second member to the first member and permits relative first member-second member pivoting that is drivable by aerodynamic forces.

19. An aircraft assembly, comprising:
   a first member extending from an aircraft airframe;
   a propeller, which is drivable to rotate; and
   a second member on which the propeller is supported and which is aerodynamically pivotable with respect to the first member, the second member including:
      a central support member;
      one or more horizontal stabilizers extending outwardly from the central support member; and
      one or more vertical stabilizers extending from respective distal ends of the horizontal stabilizers.

20. The aircraft assembly of claim 19, further comprising an interface which couples the second member to the first member and permits relative first member-second member pivoting that is drivable by aerodynamic forces.

* * * * *